(12) United States Patent
Patil et al.

(10) Patent No.: US 10,111,156 B2
(45) Date of Patent: Oct. 23, 2018

(54) NEIGHBORHOOD LEARNING USING NEIGHBOR AWARENESS NETWORKING

(71) Applicant: QUALCOMM Incorporated, San Diego, CA (US)

(72) Inventors: Abhishek Pramod Patil, San Diego, CA (US); Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 14/937,020

(22) Filed: Nov. 10, 2015

(65) Prior Publication Data

US 2016/0135115 A1     May 12, 2016

Related U.S. Application Data

(60) Provisional application No. 62/078,307, filed on Nov. 11, 2014.

(51) Int. Cl.
| | |
|---|---|
| *H04W 48/08* | (2009.01) |
| *H04W 56/00* | (2009.01) |
| *H04W 48/02* | (2009.01) |
| *H04W 4/80* | (2018.01) |
| *H04W 48/16* | (2009.01) |
| *H04W 84/12* | (2009.01) |

(Continued)

(52) U.S. Cl.
CPC ............. *H04W 48/08* (2013.01); *H04W 4/80* (2018.02); *H04W 48/02* (2013.01); *H04W 48/16* (2013.01); *H04W 56/002* (2013.01); *H04W 8/005* (2013.01); *H04W 84/12* (2013.01); *H04W 84/18* (2013.01)

(58) Field of Classification Search
CPC ..... H04W 4/008; H04W 8/005; H04W 28/18; H04W 48/02; H04W 48/08; H04W 48/16; H04W 56/002; H04W 56/0025; H04W 72/1215; H04W 84/12; H04W 84/18; H04W 4/80
See application file for complete search history.

(56) References Cited

U.S. PATENT DOCUMENTS 7,149,216 B1 * 12/2006 Cheriton ................. H04L 45/60
                                                                                   370/392
2008/0080414 A1    4/2008 Thubert et al.

(Continued)

FOREIGN PATENT DOCUMENTS

WO        2014126606 A1     8/2014

OTHER PUBLICATIONS

Pandey, S., et al. "FILS Reduced Neighbor Report," Cisco Powerpoint Presentation, Sep. 17, 2012, vol. 802.11ai, No. 1, IEEE, Piscataway, NJ, 19 pages.

(Continued)

*Primary Examiner* — Khoa Huynh
(74) *Attorney, Agent, or Firm* — Qualcomm Incorporated - Toler

(57) ABSTRACT

A method for communicating Neighborhood Information includes generating the Neighborhood Information at an access point. The method also includes communicating the Neighborhood Information from the access point to a second access point in a Neighbor Aware Network (NAN).

25 Claims, 5 Drawing Sheets

(51) Int. Cl.
*H04W 8/00* (2009.01)
*H04W 84/18* (2009.01)

(56) References Cited

U.S. PATENT DOCUMENTS

| | | | | |
|---|---|---|---|---|
| 2011/0110349 A1* | 5/2011 | Grandhi | ............... | H04W 28/18 |
| | | | | 370/338 |
| 2014/0206407 A1* | 7/2014 | Kim | ...................... | H04W 8/005 |
| | | | | 455/515 |
| 2014/0219193 A1* | 8/2014 | Linde | ............... | H04W 72/1215 |
| | | | | 370/329 |
| 2014/0254569 A1 | 9/2014 | Abraham et al. | | |

OTHER PUBLICATIONS

International Search Report and Written Opinion for International Application No. PCT/US2015/060102, ISA/EPO, dated Feb. 25, 2016, 18 pages.

* cited by examiner

NEIGHBORHOOD LEARNING USING NEIGHBOR AWARENESS NETWORKING

I. CLAIM OF PRIORITY

The present application claims priority from U.S. Provisional Patent Application No. 62/078,307 entitled "NEIGHBORHOOD LEARNING USING NEIGHBOR AWARENESS NETWORKING," filed Nov. 11, 2014, the contents of which are incorporated by reference in their entirety.

II. FIELD

The present disclosure is generally related to a Neighbor Aware Network.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A wireless device (e.g., a station) may communicate a probe request to an access point to retrieve information about a surrounding neighborhood. For example, the access point may provide the wireless device with a short neighbor report (SNR) according to an Institute of Electrical and Electronics Engineers (IEEE) 802.11ai specification, a neighbor report according to an IEEE 802.11v specification, or other information that includes connectivity information of neighboring access points. The wireless device may use the information to connect to one or more neighboring access points. For example, the information may identify operating channels of the neighboring access points, media access control (MAC) addresses of neighboring access points, target beacon transmission times (TBTTs) of neighboring access points, etc.

However, the information stored at the access point may be limited to information associated with an operator's network and/or may not be current (e.g., up to date). For example, the access point may not receive updated information in real-time. To illustrate, the access point may receive Neighborhood Information once-a-day, once-a-week, etc. Additionally, current techniques for acquiring Neighborhood Information may increase the latency of the wireless device. For example, the access point may request that the wireless device acquire network information from a neighboring access point and "report back" to the access point. Thus, the wireless device may have to scan through channels to find the neighboring access point (e.g., the wireless device tunes to other channels rather than to a primary operating channel), which may increase latency for operations performed at the wireless device.

IV. SUMMARY

The present disclosure is directed to systems and methods that enable access points within a Neighbor Aware Network (NAN) to communicate Neighborhood Information. For example, an access point (e.g., an advertising access point) in a NAN may advertise its Neighborhood Information (e.g., short neighbor reports (SNRs), neighbor reports, etc.) to a neighboring access point (e.g., a receiving access point) in the NAN using a NAN operating dedicated channel in the NAN. The receiving access point may be one-hop or two-hops from the advertising access point to reduce traffic in the NAN. Upon receiving advertised Neighborhood Information, the receiving access point may update its Neighborhood Information with the advertised Neighborhood Information so that stations subscribed to the receiving access point can access connectivity data associated with the advertising access point. Thus, access points may acquire Neighborhood Information from other access points in real-time via the NAN operating dedicated channel. Additionally, the access points may forego requesting wireless devices to obtain Neighborhood Information, which may decrease the latency for operations performed at the wireless devices.

According to one aspect of the present disclosure, a method for communicating Neighborhood Information between access points in a Neighbor Aware Network (NAN) to enable efficient updating of NAN properties includes generating the Neighborhood Information at a first access point that is participating in the NAN. The Neighborhood Information indicates at least one of network properties of the first access point and network properties of at least one other access point within a broadcast range of the first access point. The method also includes detecting, at the first access point, a second access point that is participating in the NAN. A NAN data path channel communicatively couples the second access point to the first access point. The method further includes communicating the Neighborhood Information from the first access point to the second access point. Upon receiving the Neighborhood Information, the second access point is provided with data related to at least one of the network properties of the first access point and the network properties of the at least one other access point within the broadcast range of the first access point.

According to another aspect of the present disclosure, an apparatus includes a processor and a memory coupled to the processor. The memory stores instructions that are executable by the processor to perform operations including generating Neighborhood Information at a first access point that is participating in a Neighbor Aware Network (NAN). The Neighborhood Information indicates at least one of network properties of the first access point and network properties of at least one other access point within a broadcast range of the first access point. The operations also include detecting, at the first access point, a second access point that is participating in the NAN. A NAN data path channel communicatively couples the second access point to the first access point. The apparatus also includes a transmitter for communicating the Neighborhood Information from the first access point to the second access point. Upon receiving the Neighborhood Information, the second access point is provided with data related to at least one of the network properties of the first access point and the network properties of the at least one other access point within the broadcast range of the first access point.

According to another aspect of the present disclosure, a non-transitory computer-readable medium includes instructions for communicating Neighborhood Information between access points in a Neighbor Aware Network (NAN) to enable efficient updating of NAN properties. The instructions, when executed by a processor, cause the processor to perform operations including generating the Neighborhood Information at a first access point that is participating in the NAN. The Neighborhood Information indicates at least one of network properties of the first access point and network properties of at least one other access point within a broadcast range of the first access point. The operations also include detecting, at the first access point, a second access point that is participating in the NAN. A NAN data path channel communicatively couples the second access point to the first access point. The operations further include initiating communication of the Neighborhood Information from the first access point to the second access point. Upon receiving the Neighborhood Information, the second access point is provided with data related to at least one of the network properties of the first access point and the network properties of the at least one other access point within the broadcast range of the first access point.

According to another aspect of the present disclosure, an apparatus includes means for generating Neighborhood Information at a first access point that is participating in a Neighbor Aware Network (NAN). The Neighborhood Information indicates at least one of network properties of the first access point and network properties of at least one other access point within a broadcast range of the first access point. The apparatus also includes means for detecting a second access point that is participating in the NAN. A NAN data path channel communicatively couples the second access point to the first access point. The apparatus further includes means for communicating the Neighborhood Information from the first access point to the second access point. Upon receiving the Neighborhood Information, the second access point is provided with data related to at least one of the network properties of the first access point and the network properties of the at least one other access point within the broadcast range of the first access point.

According to another aspect of the present disclosure, a method includes receiving, at a first access point, Neighborhood Information from a second access point via a NAN operating dedicated channel in a Neighbor Aware Network (NAN). The method also includes relaying the Neighborhood Information to a third access point in the NAN via the NAN operating dedicated channel.

According to another aspect of the present disclosure, an apparatus includes a processor and a memory coupled to the processor. The memory stores instructions that are executable by the processor to perform operations. The operations include receiving, at a first access point, Neighborhood Information from a second access point via a NAN operating dedicated channel in a Neighbor Aware Network (NAN). The operations further include relaying the Neighborhood Information to a third access point in the NAN via the NAN operating dedicated channel.

According to another aspect of the present disclosure, a non-transitory computer readable medium includes instructions that, when executed by a processor, cause the processor to receive, at a first access point, Neighborhood Information from a second access point via a NAN operating dedicated channel in a Neighbor Aware Network (NAN). The instructions are also executable to cause the processor to relay the Neighborhood Information to a third access point in the NAN via the NAN operating dedicated channel.

According to another aspect of the present disclosure, an apparatus includes means for receiving Neighborhood Information from a second access point via a NAN operating dedicated channel in a Neighbor Aware Network (NAN). The apparatus also includes means for relaying the Neighborhood Information to a third access point in the NAN via the NAN operating dedicated channel.

One advantage provided by at least one of the disclosed examples is an ability to build Neighborhood Information at access points of a Neighbor Aware Network (NAN) by advertising Neighborhood Information to neighboring access points (and receiving Neighborhood Information advertisements from neighboring access points) on a NAN operating dedicated channel of the NAN. Communicating Neighborhood Information between access points via the NAN operating dedicated channel may allow the access points to acquire Neighborhood Information in real-time (or near real-time) without requesting acquisition services from wireless devices. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

The disclosed systems, devices, and methods may enable an access point to communicate Neighborhood Information via a NAN operating dedicated channel in a Neighbor Aware Network (NAN) to reduce a scan time and/or to reduce probing overhead. For example, each access point in the NAN may communicate (e.g., broadcast) Neighborhood Information (e.g., short neighbor reports (SNRs), neighbor reports, etc.) on the NAN operating dedicated channel. Additionally, each access point may receive broadcasted Neighborhood Information from other access points to build Neighborhood Information.

Figure 1:
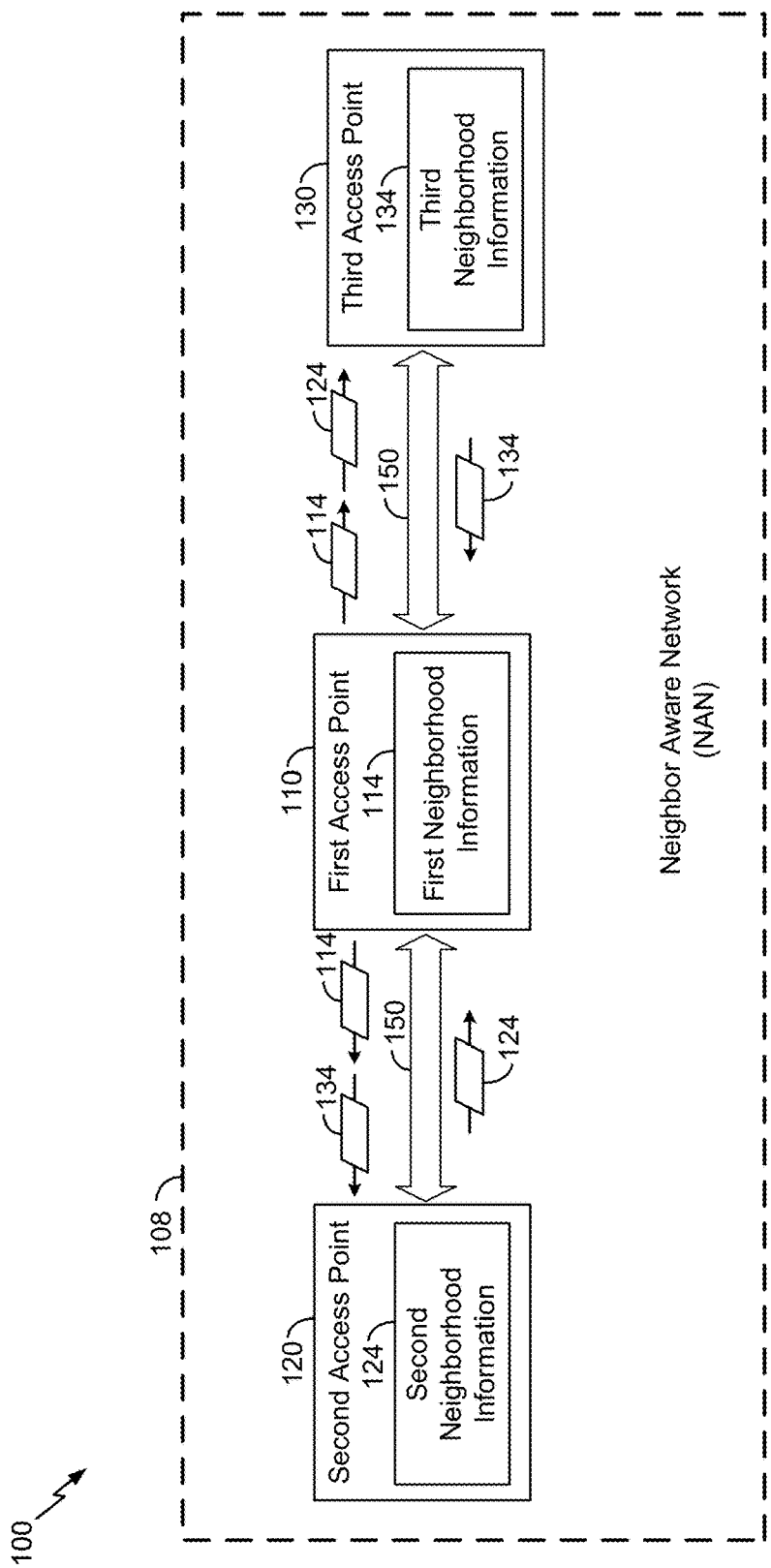
FIG. 1 is a diagram that illustrates a particular illustrative implementation of a system that is operable to enable an access point to communicate Neighborhood Information via a NAN operating dedicated channel in a NAN.

Referring to FIG. 1, a first implementation of a system 100 that is operable to enable an access point to communicate Neighborhood Information via a NAN operating dedicated channel in a NAN 108 is shown. A first access point 110, a second access point 120, and a third access point 130 are included in the NAN 108. It should be noted that although FIG. 1 depicts three access points 110, 120, 130, any number of access points may be present in the system 100. Additionally, it should be noted that in other implementations, one or more stations (e.g., mobile devices) may also be present in the system 100. One or more of the access points 110, 120, 130 may operate in compliance with one or more Institute of Electrical and Electronics Engineers (IEEE) 802.11 specifications. As non-limiting examples, the access points 110, 120, 130 may operate in compliance with an IEEE 802.11ai specification, an IEEE 802.11v specification, and IEEE 802.11b specification, etc.

Each of the access points 110, 120, 130 may be a node of a wireless network. For example, each of the access points 110, 120 130 may be an IEEE 802.11 access point that supports (e.g., manages) a corresponding wireless data network. For example, the first access point 110 may support a first network, the second access point 120 may support a second network, and the third access point 130 may support a third network. In a shopping mall scenario, the first network may correspond to a wireless network of a coffee shop, the second network may correspond to a wireless network of a clothing store, and the third network may correspond to a wireless network of a department store.

Each access point 110, 120, 130 may be configured to generate Neighborhood Information. For example, the first access point 110 may be configured to generate first access point Neighborhood Information (AP Neighborhood Information) 114, the second access point 120 may be configured to generate second Neighborhood Information 124, and the third access point 130 may be configured to generate third Neighborhood Information 134.

If the access points 110, 120, 130 are operating in compliance with an IEEE 802.11ai specification, the Neighborhood Information 114, 124, 134 may include SNRs. If the access points 110, 120, 130 are operating in compliance with an IEEE 802.11v specification, the Neighborhood Information 114, 124, 134 may include neighbor reports. The Neighborhood Information 114, 124, 134 may include a list of nearby access points in the NAN 108. To illustrate, the first Neighborhood Information 114 may include a list of access points near the first access point 110, the second Neighborhood Information 124 may include a list of access points near the second access point 120, and the third Neighborhood Information 134 may include a list of access points near the third access point 130.

For each neighboring access point identified or referenced by Neighborhood Information, such as the first Neighborhood Information 114, the second Neighborhood Information 124, or the third Neighborhood Information 134, the Neighborhood Information may also identify an operating channel of the neighboring access point, a media access control (MAC) address of the neighboring access point, a signal strength (e.g., a received signal strength indication (RSSI)) of the neighboring access point, one or more other parameters related to the neighboring access point, or a combination thereof, as illustrative, non-limiting examples. For example, the first Neighborhood Information 114, the second Neighborhood Information 124, and/or the third Neighborhood Information 134 may include or correspond to a short neighbor report (SNR) compliant with 802.11ai, such as an SNR that identifies one or more information elements (IEs) defined by the IEEE 802.11ai standard.

Additionally, or in the alternative, the Neighborhood Information 114, 124, 134 may include connectivity information associated with the respective access point 110, 120, 130. For example, the first Neighborhood Information 114, the second Neighborhood Information 124, and the third Neighborhood Information 134 may include information regarding the first access point 110, the second access point 120, and the third access point 130, respectively. For example, the Neighborhood Information 114, 124, 134 may include information regarding operating classes of the access point 110, 120, 130, primary operating channels of the access point 110, 120, 130, target beacon transmission times (TBTTs) of the access point 110, 120, 130, and basic service set identifications (BSSIDs) of the access point 110, 120, 130, respectively.

In a particular implementation, the Neighborhood Information 114, 124, 134 may include a NAN Wireless Area Network (WLAN) Connectivity attribute of the respective access point 110, 120, 130 that provide details of the respective network (e.g., advertise the access point's network). For example, the first access point 110 may use the NAN WLAN connectivity attribute to provide the neighboring access points 120, 130 detailed information about the first network, the second access point 120 may use the NAN WLAN connectivity attribute to provide the neighboring access points 110, 130 detailed information about the second network, and the third access point 130 may use the NAN WLAN connectivity attribute to provide the neighboring access points 110, 120 detailed information about the third network. For example, the NAN WLAN connectivity attribute may include information about an access point's SSID and operation channel.

Figure 2:
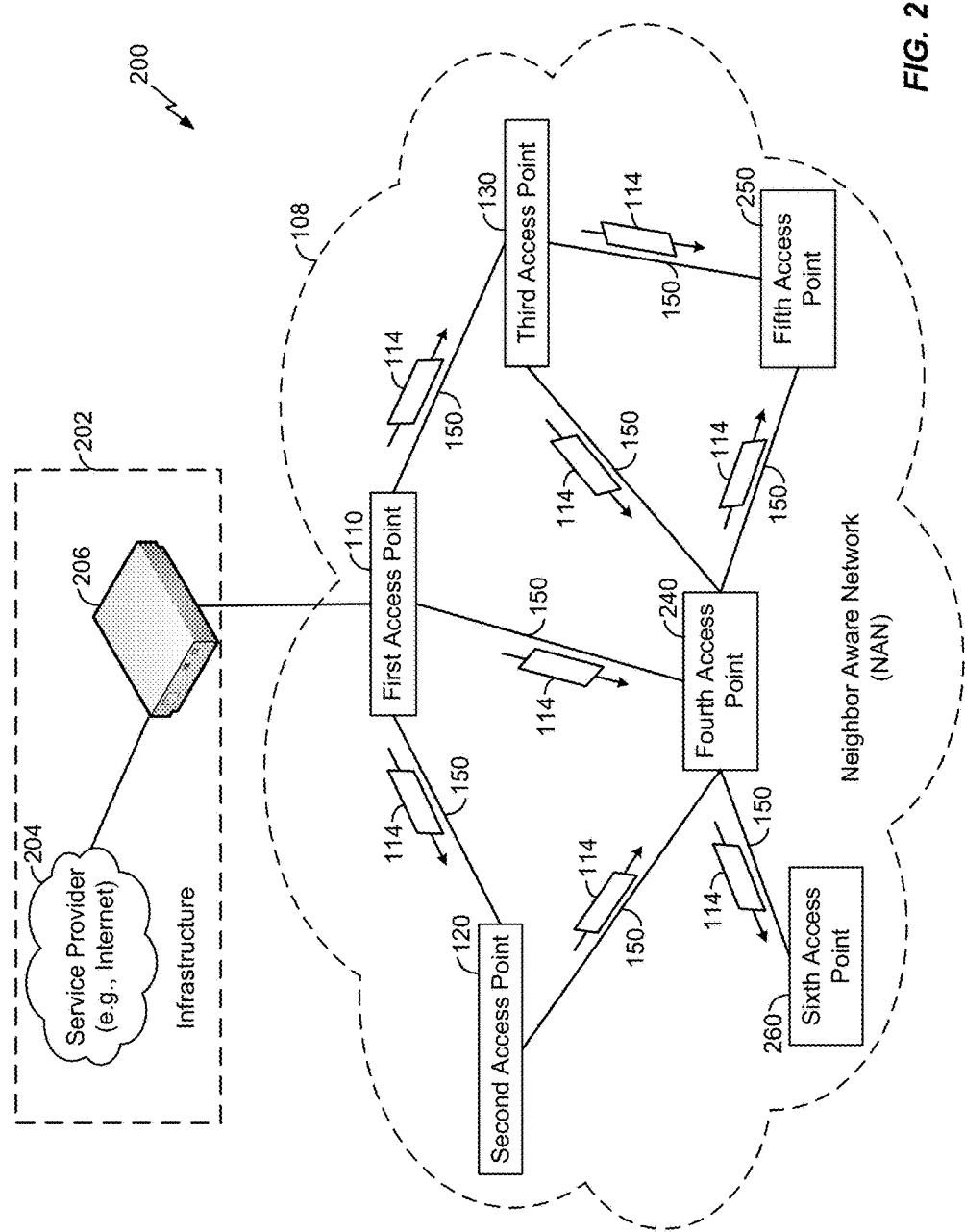
FIG. 2 is a diagram that illustrates another particular illustrative implementation of a system that is operable to enable an access point to communicate Neighborhood Information via a NAN operating dedicated channel in a NAN.

In another particular implementation, the Neighborhood Information 114, 124, 134 may be included in a "neighborhood service" advertisement, as described with respect to FIG. 2. For example, the neighborhood service advertisement may include the SSID of the advertising access point, the TBTT of the advertising access point, or any other information in a service discovery message.

The first access point 110 may be configured to provide (e.g., communicate or broadcast) the first Neighborhood Information 114 to other access points 120, 130 within transmission range of the first access point 110 via a NAN operating dedicated channel 150. The NAN operating dedicated channel 150 is a common channel shared by multiple access points 110, 120, 130 in the NAN 108 to broadcast Neighborhood Information. If the access points 110, 120, 130 are communicating (e.g., broadcasting) over a 2.4 Gigahertz (GHz) frequency band, the NAN operating dedicated channel 150 may correspond to channel 6 (e.g., a 2437 megahertz (MHz) frequency channel). In Japan and France, if the access points 110, 120, 130 are communicating over a 5 GHz frequency band, the NAN operating dedicated channel 150 may correspond to channel 44 (e.g., a 5200 MHz frequency channel). In other regions, if the access points 110, 120, 130 are communicating over a 5 GHz frequency band, the NAN operating dedicated channel 150 may correspond to channel 149 (e.g., a 5745 MHz frequency channel). In a particular implementation, the first Neighborhood Information 114 (and/or other Neighborhood Information 124, 134) may also include timing information (e.g., time synchronization function (TSF) information). The timing information may be used to coordinate channel use between the access points 110, 120, 130. For example, the timing information may be used to reduce contention/interference and lead to better utilization of the medium (e.g., the NAN operating dedicated channel).

In a similar manner, the second access point 120 may be configured to communicate the second Neighborhood Information 124 to the first access point 110 via the NAN operating dedicated channel 150, and the third access point 130 may be configured to communicate the third Neighborhood Information 134 to the first access point 110 via the NAN operating dedicated channel 150. In a particular implementation, each access point 110, 120, 130 may advertise (e.g., communicate or broadcast) the corresponding Neighborhood Information 114, 124, 134 to access points within a short range (e.g., a one-hop range or a two-hop range).

To illustrate, the second access point 120 may advertise the second Neighborhood Information 124 to the first access point 110 (e.g., an access point within a one-hop range of the second access point 120) and to the third access point 130 (e.g., an access point within a two-hop range of the second access point 120). To advertise the second Neighborhood Information 124 to the third access point 130, the second access point 120 may communicate (e.g., broadcast) the second Neighborhood Information 124 to the first access point 110, and the first access point 110 may retransmit (e.g., proxy or rebroadcast) the second Neighborhood Information 124 to the third access point 130. A hop count and a provider MAC address may be provided in the rebroadcast of the second Neighborhood Information 124 to control the number of rebroadcasts (e.g., control the hop count to be less than or equal to two). Although the first access point 110 is depicted as rebroadcasting the second Neighborhood Information 124, in other implementations, a station (e.g., a mobile phone) subscribed to the second access point 120 may receive the second Neighborhood Information 124 and may rebroadcast the second Neighborhood Information 124 to the third access point 130.

As another non-limiting example, the third access point 130 may advertise the third Neighborhood Information 134 to the first access point 110 (e.g., an access point within a one-hop range of the third access point) and to the second access point 120 (e.g., an access point within a two-hop range of the third access point 130). To advertise the third Neighborhood Information 134 to the second access point 130, the third access point 130 may communicate (e.g., broadcast) the third Neighborhood Information 134 to the first access point 110, and the first access point 110 may retransmit (e.g., proxy or rebroadcast) the third Neighborhood Information 134 to the second access point 120. A hop count and a provider MAC address may be provided in the rebroadcast of the third Neighborhood Information 134 to control the number of rebroadcasts (e.g., control the hop count to be less than or equal to two). Although the first access point 110 is depicted as rebroadcasting the third Neighborhood Information 134, in other implementations, a station subscribed to the third access point 130 may receive the third Neighborhood Information 134 and may rebroadcast the third Neighborhood Information 134 to the second access point 120.

Upon receiving Neighborhood Information from another access point, the receiving access point may populate (e.g., update) its Neighborhood Information. For example, upon receiving the first Neighborhood Information 114 from the first access point 110, the second access point 120 may update the second Neighborhood Information 124 with data from the first Neighborhood Information 114 (e.g., the second access point 120 may gather information about the first access point 110). For example, the second access point 120 may update the second Neighborhood Information 124 with operating classes for access points identified in the first Neighborhood Information 114 (including the first access point 110), primary operating channels of access points identified in the first Neighborhood Information 114, TBTTs of access points identified in the first Neighborhood Information 114, and SSIDs of access points identified in the first Neighborhood Information 114.

The system 100 of FIG. 1 may enable Neighborhood Information (e.g., the Neighborhood Information 114, 124, 134) to be communicated between the access points 110, 120, 130 using the NAN operating dedicated channel 150 in the NAN 108. Thus, if the first access point 110 broadcasts the first Neighborhood Information 114, surrounding access points (e.g., the second and third access points 120, 130) may receive the broadcast on the NAN operating dedicated channel 150 during the discovery window (e.g., a 16 ms window occurring approximately once every 512 ms) and may update network properties based on the broadcast.

Additionally, the system 100 may include safeguards to reduce the amount of traffic (e.g., Neighborhood Information) on the NAN operating dedicated channel 150. For example, during operation, each access point 110, 120, 130 may determine whether to suppress the broadcast of Neighborhood Information 114, 124, 134 based on the received signal strength of at least one neighboring access point's fast initial link setup (FILS) frame on the NAN operating dedicated channel 150. As used herein, an FILS frame may correspond to any broadcast from an access point that includes Neighborhood Information or any other information used to facilitate an initial link setup between a mobile station and an access point. For example, an FILS frame may include a beacon frame, an FILS discovery frame, a probe response, etc. Each access point 110, 120, 130 may scan the NAN operating dedicated channel 150 to detect FILS frames from neighboring access points and measure the received signal strength of the detected FILS frames. If the received signal strength of at least one neighboring point's FILS frame on the NAN operating dedicated channel 150 satisfies a threshold, an access point may suppress transmission of an FILS broadcast to reduce traffic on the NAN operating dedicated channel 150.

As an illustrative example, prior to broadcasting an FILS frame, the first access point 110 may scan (e.g., "listen in on") the NAN operating dedicated channel 150 for a particular time period to detect one or more broadcasted FILS frames from one or more access points. In a particular implementation, the first access point 110 may scan the NAN operating dedicated channel 150 for approximately 5 ms to detect Neighborhood Information from one or more access points. Based on the scan, the first access point 110 may determine whether an access point within a close proximity has broadcasted an FILS frame on the NAN operating dedicated channel 150. In response to a determination that an access point within a relatively close proximity has broadcasted an FILS frame on the NAN operating dedicated channel 150, the first access point 110 may suppress broadcast transmission of the FILS frame. For example, the third access point 130 may broadcast a first FILS frame (that includes the first Neighborhood Information 114 to be broadcasted by the first access point 110) via the NAN operating dedicated channel 150, and the first access point 110 may detect the first FILS frame during scanning operations. The first access point 110 may measure a first received signal strength of the first FILS frame. For example, the first access point 110 may determine a proximity of the third access point 130 based on a received signal strength indicator (RSSI) associated with the first FILS frame. A relatively high RSSI may indicate that the third access point 130 is in close proximity to the first access point 110, and a relatively low RSSI may indicate that the third access point 130 is not in close proximity to the first access point 110.

In response to a determination that the first received signal strength of the first FILS frame satisfies a first threshold (e.g., is greater than or equal to a first threshold signal strength or has a relatively high RSSI), the first access point 110 may suppress the broadcast of the first Neighborhood Information 114 via the NAN operating dedicated channel 150. For example, the first access point 110 may determine that the third access point's 130 coverage area is substantially similar to the coverage area of the first access point 110 when the first received signal strength satisfies the first threshold. However, if the first access point 110 determines that the first FILS frame does not reference each of the neighboring access points in the first Neighborhood Information 114, the first access point 110 may broadcast the first Neighborhood Information 114 via the NAN operating dedicated channel 150.

The first threshold may correspond to a suppression range (e.g., a maximum range between the first access point 110 and the third access point 130 that results in the first access point 110 suppressing the broadcast of the first Neighborhood Information 114). For example, the suppression range increases as the first threshold decreases. In a particular implementation, the suppression range may be preprogrammed into each access point 110, 120, 130 according to an industry standard, such as an IEEE 802.11 standard. A short suppression range may improve reliability by increasing the number of broadcasters. However, a short suppression range may also increase overhead (e.g., generate a relatively large amount of redundant traffic on the NAN operating dedicated channel 150) and may increase broadcast contention.

Additionally, the first access point 110 may determine whether three or more access points within a relatively close proximity have broadcast an FILS frame during scanning operations. For example, during a scanning operation of the first access point 110, the third access point 130 may broadcast the first FILS frame via the NAN operating dedicated channel 150, the second access point 120 may broadcast a second FILS frame via the NAN operating dedicated channel 150, and a fourth access point (not shown) may broadcast a third FILS frame via the NAN operating dedicated channel 150. The first access point 110 may detect the first FILS frame, the second FILS frame, and the third FILS frame on the NAN operating dedicated channel 150. In addition, the first access point 110 may measure the first received signal strength of the first FILS frame, the second received signal strength of the second FILS frame, and the third received signal strength of the third FILS frame. The first access point 110 may determine the proximity of each access point based on RSSIs associated with the received FILS frames.

In response to a determination that each received signal strength satisfies a second threshold (e.g., is greater than or equal to a second threshold signal strength or has a mid-range RSSI), the first access point 110 may suppress the broadcast of the first Neighborhood Information 114. For example, the first access point 110 may determine that the coverage areas of the other access points, collectively, have a relatively high probability of covering the stations in the coverage area of the first access point 110 when each received signal strength satisfies the second threshold. In the illustrative implementation, the first access point 110 may be within a triangle formed by the other access points. Thus, any stations in the coverage area of the first access point 110 would most likely receive at least one of the first FILS frame, the second FILS frame, or the third FILS frame.

The first access point 110 may reduce overhead (e.g., congestion) on the NAN operating dedicated channel 150 by suppressing the broadcast of the first Neighborhood Information 114 when the received signal strength of one or more neighboring access point's FILS frames on the NAN operating dedicated channel 150 satisfies a threshold. Implementing the coordination scheme described above may enable FILS frames to be spread in time and coverage area. It will be appreciated that the coordination scheme does not require any messaging between access points because the access points may scan the NAN operating dedicated channel 150 (e.g., the common channel shared by each access point) to determine received signal strengths of FILS frames.

Although the system 100 is described with respect to NAN devices (e.g., the access points 110, 120, 130), in other implementations, similar techniques may be applicable to Bluetooth® enabled devices and/or Bluetooth® Low Energy enabled devices. As a non-limiting example, a scheme similar to the NAN scheme described above may utilize Bluetooth® for network discovery. Bluetooth® packets may carry information about the access point and the network to aid client devices to make informed decisions for access point selections/network selections. In a Bluetooth® system, the access point and client devices may have a Bluetooth® radio co-existing with the IEEE 802.11 radio on the device. Bluetooth® is a registered trademark of Bluetooth SIG, Inc.

Referring to FIG. 2, another particular implementation of a system 200 that is operable to enable an access point to communicate Neighborhood Information via a NAN operating dedicated channel in the NAN 108 is shown. The system 200 includes infrastructure 202 that is accessible via the NAN 108. The NAN 108 supports multi-hop Neighborhood Information access.

The infrastructure 202 includes service provider equipment 204 coupled to a gateway 206. The infrastructure 202 is a wired network that may have access to an outside network. The wired network may include at least one of a router, an Ethernet switch, or a server. In a particular implementation, the service provider equipment 204 may provide a service (e.g., an internet service, an application service, a file-sharing service, etc.) to subscriber units that subscribe to the service via the gateway 206. The gateway 206 may have a media access control (MAC) address to enable the subscriber units to identify the gateway 206 (e.g., during subscription activities). In a particular implementation, the gateway 206 may include a dynamic host configuration protocol (DHCP) server that is configured to generate internet protocol (IP) addresses for subscriber units that subscribe to the service.

The NAN 108 may include the first access point 110, the second access point 120, the third access point 130, a fourth access point 240, a fifth access point 250, and a sixth access point 260. The first access point 110 may have "direct access" to the infrastructure 102.

The first access point 110 may be configured to access the infrastructure 202 via the gateway 206. Based on the access to the infrastructure 202, the first access point 110 may also be configured to subscribe to a service (e.g., an infrastructure service) via the gateway 206. Upon subscribing to the service, the access point 110 may be configured to provide a service announcement to the second access point 120, the third access point 130, and the fourth access point 240 via the NAN operating dedicated channel 150. The service announcement may include the first Neighborhood Information 114 of the first access point 110. For example, the service announcement may include the primary operating channel of the first access point 110, the SSID of the first access point 110, the TBTT of the first access point 110, etc.

The service announcement may also advertise the service subscribed to by the first access point 110 (e.g., the service associated with the infrastructure 202) and may include information for connecting other access points 120, 130, 240, 250, 260 to the infrastructure 202. For example, the service announcement may include the MAC address of the gateway 206 and a MAC address of the first access point 110.

Each access point device 120, 130, 240 that received a service announcement (including the first Neighborhood Information 114) from the first access point 110 may proxy (e.g., relay) the service announcement (and the first Neighborhood Information 114) to other access points 240, 250, 260 (e.g., access points within a two-hop range of the first access point 110). Upon receiving the first Neighborhood Information 114 from the first access point 110 (or a relayed version of the first Neighborhood Information 114 from another access point), the access points 120, 130, 240, 250, 260 may update their Neighborhood Information with the Neighborhood Information 114.

The system 200 of FIG. 2 may enable Neighborhood Information (e.g., the first Neighborhood Information 114) to be communicated between the access points 110, 120, 130, 240, 250, 260 using the NAN operating dedicated channel 150 in the NAN 108. Thus, if the first access point 110 broadcasts the first Neighborhood Information 114, surrounding access points (e.g., the second and third access points 120, 130, 240, 250, 260) may receive the broadcast on the NAN operating dedicated channel 150 during the discovery window (e.g., a 16 ms window occurring approximately once every 512 ms) and may update network properties based on the broadcast. Communicating the first Neighborhood Information 114 at access points 120, 130, 240, 250, 260 via the NAN operating dedicated channel 150 may allow the access points 120, 130, 240, 250, 260 to acquire Neighborhood Information in real-time without requesting acquisition services from wireless devices (e.g., subscribing stations).

Figure 3:
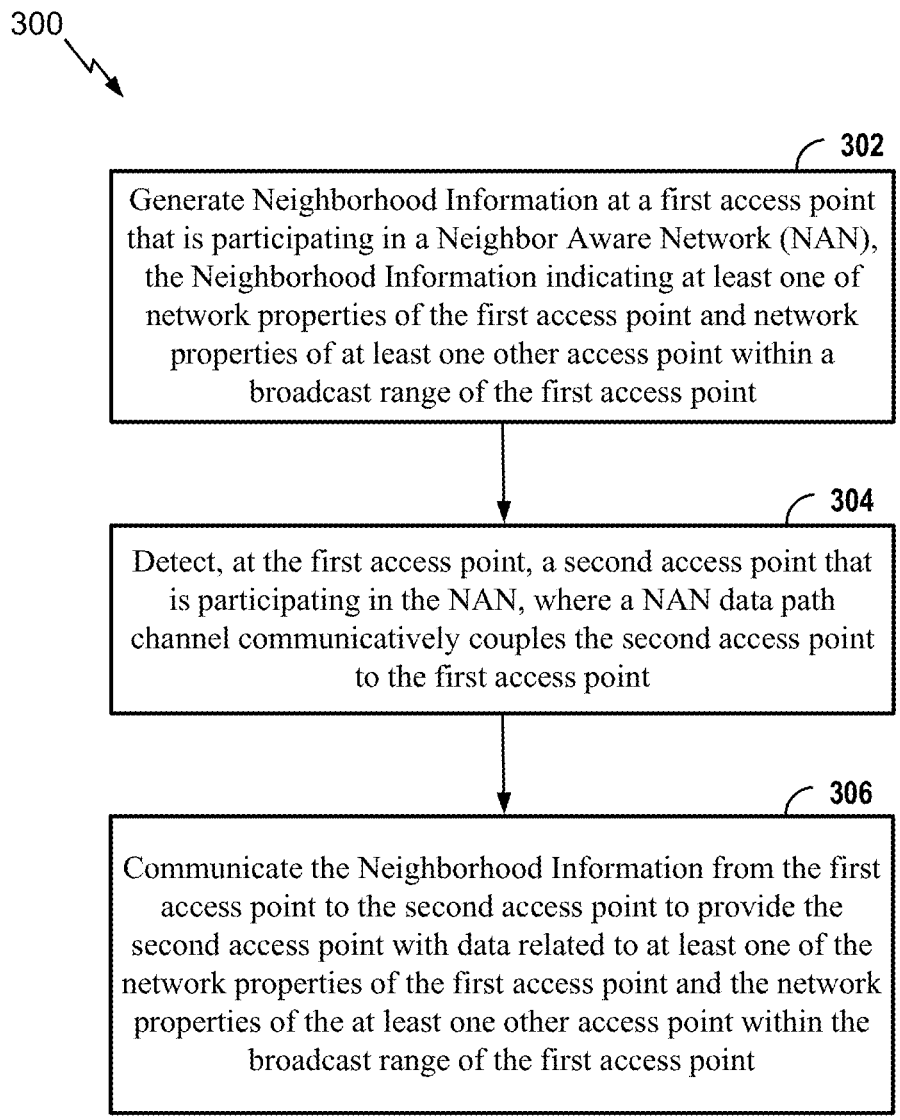
FIG. 3 is a flow diagram that illustrates an illustrative method that enables an access point to communicate Neighborhood Information via a NAN operating dedicated channel in a NAN.

Referring to FIG. 3, a particular implementation of a method 300 that enables an access point to communicate Neighborhood Information via a NAN operating dedicated channel in a NAN is shown. The method 300 may be performed at any of the access points 110, 120, 130, 240, 250, 260 of FIGS. 1-2.

The method 300 includes generating Neighborhood Information at a first access point that is participating in a NAN, at 302. The Neighborhood Information may indicate at least one of network properties of the first access point and network properties of at least one other access point within a broadcast range of the first access point. For example, referring to FIG. 1, the first access point 110 may generate the first Neighborhood Information 114. The first Neighborhood Information 114 may include information regarding an operating class of the first access point 110, a primary operating channel of the first access point 110, a TBTT of the first access point 110, a BSSID of the first access point 110, etc. In a particular implementation, the first Neighborhood Information 114 may include an SNR according to an IEEE 802.11ai specification. In another particular implementation, the first Neighborhood Information 114 may include a neighbor report according to an IEEE 802.11v specification.

A second access point that is participating in the NAN may be detected at the first access point, at 304. A NAN data path channel may communicatively couple the second access point to the first access point. For example, referring to FIG. 1, the first access point 110 may detect the second access point 120 in the NAN.

The Neighborhood Information may be communicated from the first access point to the second access point to provide the second access point with data related to at least one of the network properties of the first access point and the network properties of the at least one other access point within the broadcast range of the first access point, at 306. For example, referring to FIG. 1, the first access point 110 may provide the first Neighborhood Information 114 to the second access point 120 in the NAN 108. In a particular implementation, the first Neighborhood Information 114 may be included in a service announcement, as described with respect to FIG. 2. For example, the first Neighborhood Information may be advertised as part of a neighborhood service. According to one implementation, the Neighborhood Information is communicated to the second access point according to a low energy protocol, such as a Bluetooth® protocol or a Bluetooth® Low Energy protocol.

According to one implementation of the method 300, the Neighborhood Information may is communicated to the second access point via a NAN operating dedicated channel. For example, the NAN operating dedicated channel may be shared by a plurality of access points participating in the NAN. The plurality of access points may include the first access point and the second access point. The NAN operating dedicated channel may be distinct from the NAN data path channel. According to one implementation of the method 300, the Neighborhood Information includes time synchronization function (TSF) information for coordinating operations of the plurality of access points over one or more channels. For example, based on the TSF information, the access point may communicate (e.g., broadcast, unicast, or multicast) the Neighborhood Information using the NAN operating dedicated channel at a first time and the second access point may communicate second Neighborhood Information using the NAN operating dedicated channel at a second time to reduce channel congestion. The TSF information may be based on at least one of a NAN beacon transmission operation, a proxy announcement within the NAN, and another transmission within the NAN. According to one implementation, the TSF information is communicated according to a low energy protocol, such as a Bluetooth® protocol or a Bluetooth® Low Energy protocol. According to one implementation, the second access point communicates the Neighborhood Information to a third access point that is within a one-hop range of the second access point.

According to one implementation, if there are more than three access points operating on a particular channel, then the access points may be time-synchronized via the NAN operation. Based on the time-synchronization, the more than three access points may coordinate operation on the particular channels to reduce collisions between transmissions. In addition, the three access points may coordinate actions (e.g., operations) on a NAN channel (e.g., the NAN operating dedicated channel). For example, the three access points may take turns advertising Neighborhood Information (or infrastructure service information associated with a provided service) on the NAN channel.

According to one implementation, the method 300 may include scanning the NAN operating dedicated channel during a particular time period to detect other possible Neighborhood Information broadcasted from one or more access points prior to communicating the Neighborhood Information to the second access point. According to this implementation, the first access point determines whether to suppress communication of the Neighborhood Information to the second access point based on corresponding signal strengths of the detected other possible Neighborhood Information. For example, the first access point may determine to suppress communication of the Neighborhood Information if a received signal strength of another Neighbor Information from a third access point participating in the NAN satisfies a threshold.

According to one implementation of the method 300, the Neighborhood Information is a neighbor report according to an Institute of Electrical and Electronics Engineers (IEEE) 802.11ai specification. The neighbor report may include a list of nearby access points in a proximity of the first access point. The Neighborhood Information may be communicated using a fast initial link setup (FILS) discovery frame, a probe request, or a beacon frame of the access point. According to another implementation of the method 300, the Neighborhood Information is a neighbor report according to an Institute of Electrical and Electronics Engineers (IEEE) 802.11v specification. IEEE 802.11ai and IEEE 802.11v may have different formats of the neighbor report. In addition to a beacon/probe response, IEEE 802.11ai may also permit advertising in FILS discovery frames.

According to one implementation of the method 300, the Neighborhood Information includes information regarding a third access point in the NAN. The information may include at least one of an operating class of the third access point, a primary operating channel of the third access point, a target beacon transmission time of the third access point, a basic service set identification (BSSID) of the third access point, a service set identification (SSID) of the third access point, a security domain associated with the third access point, or one or more access network query specification (ANQP) parameters associated with the third access point.

The method 300 of FIG. 3 may enable Neighborhood Information (e.g., the first Neighborhood Information 114) to be communicated between the access points 110, 120, 130, 240, 250, 260 using the NAN operating dedicated channel 150 in the NAN 108. Thus, if the first access point 110 broadcasts the first Neighborhood Information 114, surrounding access points (e.g., the second and third access points 120, 130, 240, 250, 260) may hear the broadcast on the NAN operating dedicated channel 150 during the discovery window (e.g., a 16 ms window occurring approximately once every 512 ms) and may update network properties based on the broadcast. Communicating Neighborhood Information between access points via the NAN operating dedicated channel may allow the access points to acquire Neighborhood Information in real-time without requesting acquisition services from wireless devices.

Figure 4:
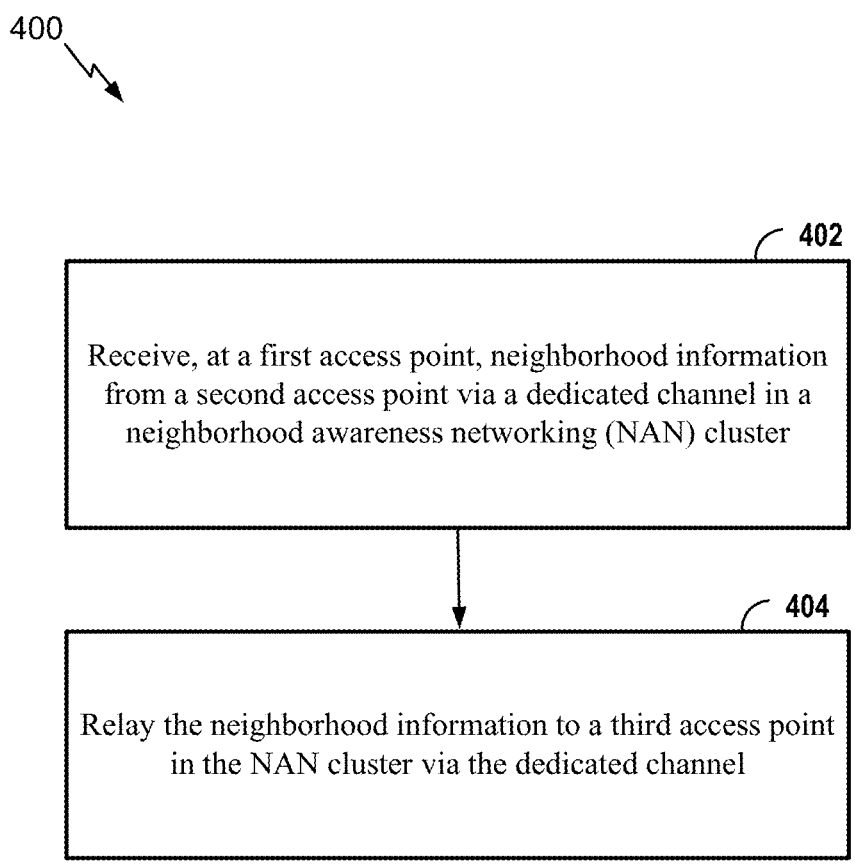
FIG. 4 is a flow diagram of another illustrative method that enables an access point to communicate Neighborhood Information via a NAN operating dedicated channel in a NAN.

Referring to FIG. 4, another particular implementation of a method 400 that enables an access point to communicate Neighborhood Information via a NAN operating dedicated channel in a NAN is shown. The method 400 may be performed at any of the access points 110, 120, 130, 240, 250, 260 of FIGS. 1-2.

The method 400 includes receiving, at a first access point, Neighborhood Information from a second access point via a NAN operating dedicated channel in a NAN, at 402. For example, referring to FIG. 1, the first access point 110 may receive the second Neighborhood Information 124 from the second access point 120 via the NAN operating dedicated channel 150 in the NAN 108.

The Neighborhood Information may be relayed to a third access point in the NAN via the NAN operating dedicated channel, at 404. For example, referring to FIG. 1, the first access point 110 may relay (e.g., proxy or rebroadcast) the second Neighborhood Information 124 to the third access point 130 via the NAN operating dedicated channel 150.

The method 400 of FIG. 4 may enable Neighborhood Information (e.g., the first Neighborhood Information 114) to be communicated between the access points 110, 120, 130, 240, 250, 260 using the NAN operating dedicated channel 150 in the NAN 108. Thus, if the first access point 110 broadcasts the first Neighborhood Information 114, surrounding access points (e.g., the second and third access points 120, 130, 240, 250, 260) may receive the broadcast on the NAN operating dedicated channel 150 during the discovery window (e.g., a 16 ms window occurring approximately once every 512 ms) and may update network properties based on the broadcast.

Figure 5:
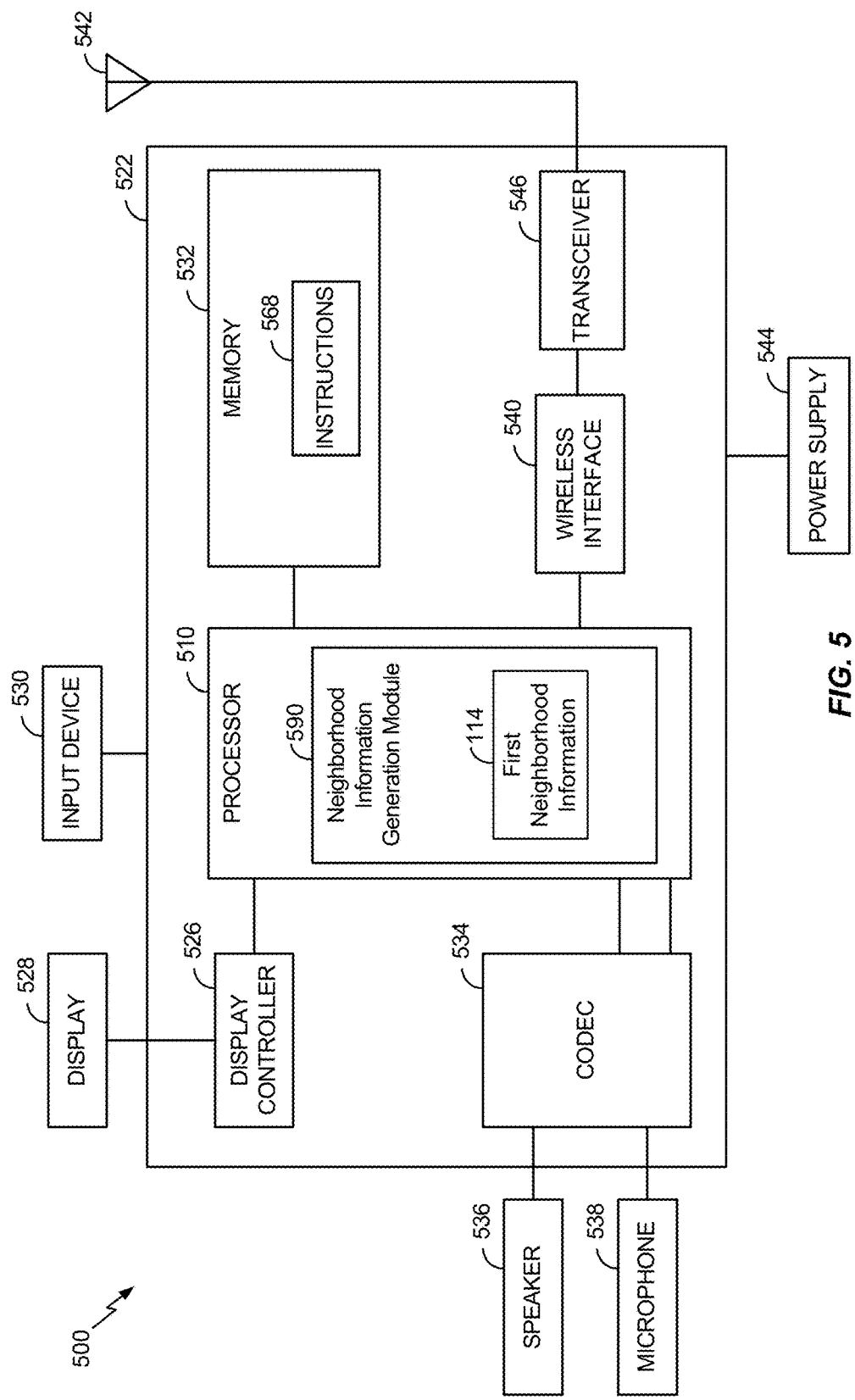
FIG. 5 is a diagram of a wireless device that is operable to support various implementations of one or more methods, systems, apparatuses, and/or computer-readable media disclosed herein.

Referring to FIG. 5, a particular illustrative implementation of a wireless communication device is depicted and generally designated 500. The device 500 includes a processor 510, such as a digital signal processor, coupled to a memory 532.

The processor 510 may be configured to execute software (e.g., a program of one or more instructions 568) stored in the memory 532. Additionally or alternatively, the processor 510 may be configured to execute one or more instructions stored in a memory of a wireless interface 540 (e.g., an IEEE 802.11 interface). For example, the wireless interface 540 may be configured to operate in accordance with an IEEE 802.11 standard. In a particular implementation, the processor 510 may be configured to operate in accordance with the method 300 of FIG. 3 and/or the method 400 of FIG. 4. For example, the processor 510 may include a neighborhood generation module 590 that is configured to generate Neighborhood Information (e.g., the first Neighborhood Information 114).

The wireless interface 540 may be coupled to the processor 510 and to an antenna 542. For example, the wireless interface 540 may be coupled to the antenna 542 via a transceiver 546, such that wireless data received via the antenna 542 may be provided to the processor 510. Additionally, the processor 510 may communicate (e.g., communicate) the first Neighborhood Information 114 to access points via the wireless interface 540, the transceiver 546, and the antenna 542.

A coder/decoder (CODEC) 534 can also be coupled to the processor 510. A speaker 536 and a microphone 538 can be coupled to the CODEC 534. A display controller 526 can be coupled to the processor 510 and to a display device 528. In a particular implementation, the processor 510, the display controller 526, the memory 532, the CODEC 534, and the wireless interface 540 are included in a system-in-package or system-on-chip device 522. In a particular implementation, an input device 530 and a power supply 544 are coupled to the system-on-chip device 522. Moreover, in a particular implementation, as illustrated in FIG. 5, the display device 528, the input device 530, the speaker 536, the microphone 538, the antenna 542, and the power supply 544 are external to the system-on-chip device 522. However, each of the display device 528, the input device 530, the speaker 536, the microphone 538, the antenna 542, and the power supply 544 can be coupled to one or more components of the system-on-chip device 522, such as one or more interfaces or controllers.

In conjunction with the described implementations, an apparatus includes means for generating Neighborhood Information at a first access point that is participating in a NAN. The Neighborhood Information may indicate at least one of network properties of the first access point and network properties of at least one other access point within a broadcast range of the first access point. For example, the means for generating Neighborhood Information at the first access point may include a processor within any of the access points 110, 120, 130, 240, 250, 260 of FIGS. 1-2, the processor 510 programmed to execute the instructions 568 of FIG. 5, the Neighborhood Information generation module 590 of FIG. 5, one or more other devices, circuits, modules, or any combination thereof.

The apparatus may also include means for detecting a second access point that is participating in the NAN, wherein a NAN data path channel communicatively couples the second access point to the first access point. For example, the means for detecting may include a processor or sensor within any of the access points 110, 120, 130, 240, 250, 260 of FIGS. 1-2, the processor 510 programmed to execute the instructions 568 of FIG. 5, one or more other devices, circuits, modules, or any combination thereof.

The apparatus also include means for communicating the Neighborhood Information from the first access point to the second access point to provide the second access point with data related to at least one of the network properties of the first access point and the network properties of the at least one other access point within the broadcast range of the first access point. For example, the means for communicating the Neighborhood Information may include a wireless interface within any of the access points 110, 120, 130, 240, 250, 260 of FIGS. 1-2, the wireless interface 540 of FIG. 5, the transceiver 546 of FIG. 5, the antenna 542 of FIG. 5, one or more other devices, circuits, modules, or any combination thereof.

In conjunction with the described implementations, a second apparatus includes means for receiving Neighborhood Information from a second access point via a NAN operating dedicated channel in a Neighbor Aware Network (NAN). For example, the means for receiving the Neighborhood Information may include any of the access points 110, 120, 130, 240, 250, 260 of FIGS. 1-2, the wireless interface 540 of FIG. 5, the transceiver 546 of FIG. 5, the antenna 542 of FIG. 5, one or more other devices, circuits, modules, or any combination thereof.

The second apparatus may also include means for relaying the Neighborhood Information to a third access point in the NAN via the NAN operating dedicated channel. For example, the means for relaying the Neighborhood Information may include any of the access points 110, 120, 130, 240, 250, 260 of FIGS. 1-2, the wireless interface 540 of FIG. 5, the transceiver 546 of FIG. 5, the antenna 542 of FIG. 5, the processor 510 programmed to execute the instructions 568 of FIG. 5, one or more other devices, circuits, modules, or any combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method for communicating neighborhood information between access points in a neighbor aware network (NAN) to enable updating of NAN properties, the method comprising:
   generating the neighborhood information at a first access point that is participating in the NAN, the neighborhood information indicating one or more network properties of a wireless network associated with the first access point and one or more network properties of at least one other wireless network associated with another access point within a broadcast range of the first access point;
   detecting, at the first access point, a second access point that is participating in the NAN, wherein a NAN data path channel communicatively couples the second access point to the first access point;
   communicating the neighborhood information from the first access point to the second access point to provide the second access point with data related to the one or more of the network properties of the wireless network associated with the first access point and the one or more network properties of the at least one other wireless network associated with another access point within the broadcast range of the first access point;
   prior to the communicating of the neighborhood information to the second access point, scanning a NAN operating dedicated channel during a particular time period to detect other possible neighborhood information from one or more access points;
   wherein the first access point determines whether to suppress communication of the neighborhood information to the second access point based on corresponding signal strengths of the detected other possible neighborhood information;

and wherein the neighborhood information is communicated to the second access point via the NAN operating dedicated channel.

2. The method of claim 1, wherein the NAN operating dedicated channel is shared by a plurality of access points participating in the NAN, wherein the NAN operating dedicated channel is distinct from the NAN data path channel, and wherein the plurality of access points includes the first access point and the second access point.

3. The method of claim 2, wherein the neighborhood information includes time synchronization function (TSF) information for coordinating operations of the plurality of access points over one or more channels.

4. The method of claim 3, wherein the TSF information is based on at least one of a NAN beacon transmission operation, a proxy announcement within the NAN, and another transmission within the NAN.

5. The method of claim 1, wherein the second access point communicates the neighborhood information to a third access point that is within a one-hop range of the second access point.

6. The method of claim 1, wherein the first access point determines to suppress communication of the neighborhood information if a received signal strength of another neighborhood information from a third access point participating in the NAN satisfies a threshold.

7. The method of claim 1, wherein the neighborhood information includes a neighbor report according to an Institute of Electrical and Electronics Engineers (IEEE) 802.11ai specification, the neighbor report including a list of nearby access points in a proximity of the first access point.

8. The method of claim 1, wherein the neighborhood information is communicated using a fast initial link setup (FILS) discovery frame, a probe response, or a beacon frame of the first access point.

9. The method of claim 1, wherein the neighborhood information includes a neighbor report according to an Institute of Electrical and Electronics Engineers (IEEE) 802.11v specification.

10. The method of claim 1, wherein the neighborhood information includes information regarding a third access point that is participating in the NAN.

11. The method of claim 10, wherein the information regarding the third access point includes at least one of an operating class of the third access point, a primary operating channel of the third access point, a target beacon transmission time of the third access point, a basic service set identification (BSSID) of the third access point, a service set identification (SSID) of the third access point, a security domain associated with the third access point, and one or more access network query protocol (ANQP) parameters associated with the third access point.

12. The method of claim 1, wherein the neighborhood information is communicated to the second access point according to a low energy protocol, wherein the low energy protocol includes a NAN protocol, a Bluetooth protocol, or a Bluetooth Low Energy protocol.

13. The method of claim 1, wherein the neighborhood information indicates an operating channel of the first access point.

14. An apparatus comprising:
a processor;
a memory coupled to the processor, wherein the memory stores instructions;
and wherein the processor executes the instructions to perform operations comprising:

generating neighborhood information at a first access point that is participating in a neighbor aware network (NAN), the neighborhood information indicating one or more network properties of a wireless network associated with the first access point and one or more network properties of at least one other wireless network associated with another access point within a broadcast range of the first access point;

detecting, at the first access point, a second access point that is participating in the NAN, wherein a NAN data path channel communicatively couples the second access point to the first access point;

a transmitter for communicating the neighborhood information from the first access point to the second access point to provide the second access point with data related to the one or more network properties of a wireless network associated with the first access point and the one or more network properties of the at least one other wireless network associated with another access point within the broadcast range of the first access point;

prior to the communicating of the neighborhood information to the second access point, scanning a NAN operating dedicated channel during a particular time period to detect other possible neighborhood information from one or more access points;

wherein the first access point determines whether to suppress communication of the neighborhood information to the second access point based on corresponding signal strengths of the detected other possible neighborhood information;

and wherein the neighborhood information is communicated to the second access point via the NAN operating dedicated channel.

15. The apparatus of claim 14, wherein the NAN operating dedicated channel is shared by a plurality of access points participating in the NAN, wherein the NAN operating dedicated channel is distinct from the NAN data path channel, and wherein the plurality of access points includes the first access point and the second access point.

16. The apparatus of claim 15, wherein the neighborhood information includes time synchronization function (TSF) information for coordinating operations of the plurality of access points over one or more channels.

17. The apparatus of claim 14, wherein the second access point communicates the neighborhood information to a third access point that is within a one-hop range of the second access point.

18. The apparatus of claim 14, wherein the neighborhood information includes a neighbor report according to an Institute of Electrical and Electronics Engineers (IEEE) 802.11ai specification or according to an IEEE 802.11v specification.

19. The apparatus of claim 14, wherein the neighborhood information includes information regarding a third access point that is participating in the NAN.

20. The apparatus of claim 19, wherein the information regarding the third access point includes at least one of an operating class of the third access point, a primary operating channel of the third access point, a target beacon transmission time of the third access point, a basic service set identification (BSSID) of the third access point, a service set identification (SSID) of the third access point, a security domain associated with the third access point, and one or more access network query protocol (ANQP) parameters associated with the third access point.

21. The apparatus of claim 14, wherein the neighborhood information is communicated to the second access point according to a low energy protocol.

22. A non-transitory computer-readable medium comprising instructions for communicating neighborhood information between access points in a Neighbor Aware Network (NAN) to enable updating of NAN properties, the instructions, when executed by a processor, cause the processor to perform operations comprising:
- generating the neighborhood information at a first access point that is participating in the NAN, the neighborhood information indicating one or more network properties of a wireless network associated with the first access point and one or more network properties of at least one other wireless network associated with another access point within a broadcast range of the first access point;
- detecting, at the first access point, a second access point that is participating in the NAN, wherein a NAN data path channel communicatively couples the second access point to the first access point;
- initiating communication of the neighborhood information from the first access point to the second access point to provide the second access point with data related to the one or more network properties of a wireless network associated with the first access point and the one or more network properties of the at least one other wireless network associated with another access point within the broadcast range of the first access point;
- prior to the communicating of the neighborhood information to the second access point, scanning a NAN operating dedicated channel during a particular time period to detect other possible neighborhood information from one or more access points;
- wherein the first access point determines whether to suppress communication of the neighborhood information to the second access point based on corresponding signal strengths of the detected other possible neighborhood information;
- and wherein the neighborhood information is communicated to the second access point via the NAN operating dedicated channel.

23. The non-transitory computer-readable medium of claim 22, wherein the neighborhood information is communicated to the second access point via a NAN operating dedicated channel.

24. The non-transitory computer-readable medium of claim 23, wherein the NAN operating dedicated channel is shared by a plurality of access points participating in the NAN, wherein the NAN operating dedicated channel is distinct from the NAN data path channel, and wherein the plurality of access points includes the first access point and the second access point.

25. An apparatus comprising:
- means for generating neighborhood information at a first access point that is participating in a neighbor aware network (NAN), the neighborhood information indicating one or more network properties of a wireless network associated with the first access point and one or more network properties of at least one other wireless network associated with another access point within a broadcast range of the first access point;
- means for detecting a second access point that is participating in the NAN, wherein a NAN data path channel communicatively couples the second access point to the first access point;
- means for communicating the neighborhood information from the first access point to the second access point to provide the second access point with data related to the one or more network properties of the wireless network associated with the first access point and the one or more network properties of the at least one other wireless network associated with another access point within the broadcast range of the first access point;
- means for prior to the communicating of the neighborhood information to the second access point, scanning a NAN operating dedicated channel during a particular time period to detect other possible neighborhood information from one or more access points;
- wherein the first access point determines whether to suppress communication of the neighborhood information to the second access point based on corresponding signal strengths of the detected other possible neighborhood information;
- and wherein the neighborhood information is communicated to the second access point via the NAN operating dedicated channel.

* * * * *